Patented Dec. 11, 1934

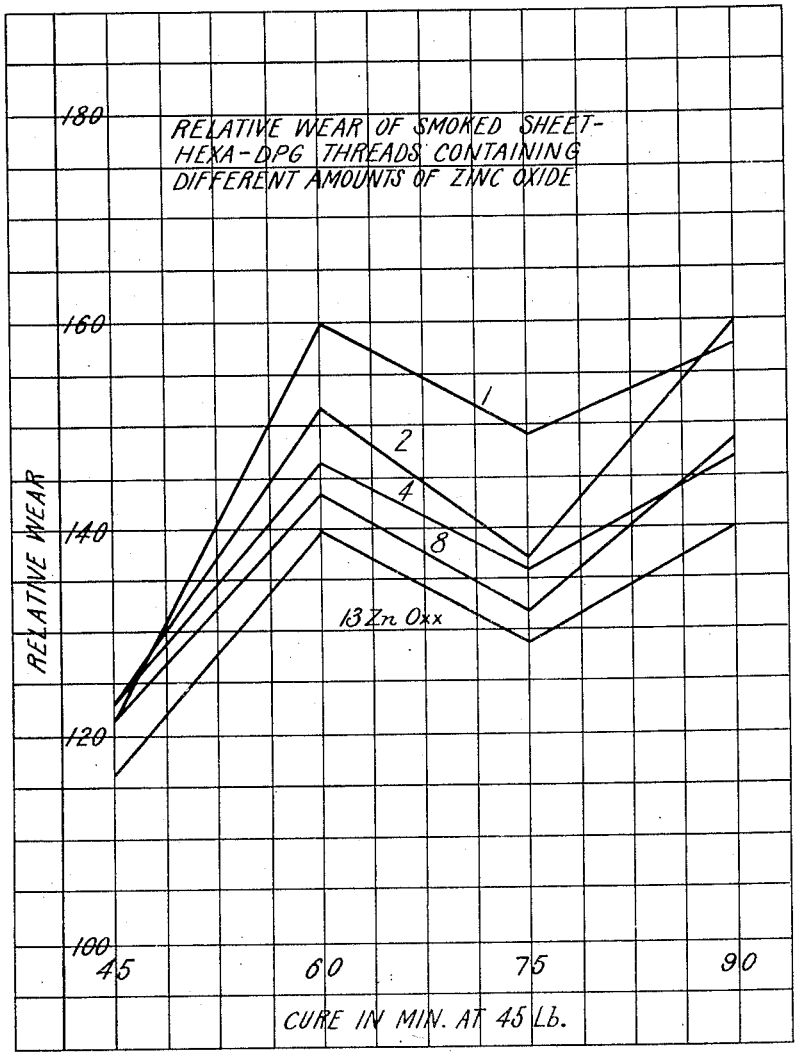

1,984,247

UNITED STATES PATENT OFFICE 1,984,247

ABRASION RESISTING RUBBER STOCKS

Sidney M. Cadwell, Grosse Pointe Village, Mich., assignor to Morgan & Wright, Detroit, Mich., a corporation of Michigan Application October 6, 1932, Serial No. 636,613

23 Claims. (Cl. 106—23)

This invention relates to improvements in rubber stocks, and particularly tire tread stocks whereby their resistance to abrasion is increased.

An object of the invention is to provide a rubber composition wherein the resistance to abrasion after vulcanization is materially increased without sacrificing any of the other desirable physical properties of such stock. The invention further aims to provide a tire having a tread which resists abrasion better than any known tire tread stock.

The usual tire tread stocks contain prior to vulcanization besides rubber, sulphur, organic accelerators and softeners, a substantial amount of carbon black and 5 or more parts by weight of zinc oxide based on 100 parts by weight of rubber. It has now been found that in the presence of substantial amounts of carbon black there is a critical range of amounts of zinc oxide above and below which the zinc oxide interferes with good abrasion characteristics. This critical range is from 1 to 3% by weight of zinc oxide based on the rubber content and varying within this range with the accelerator selected; with a strongly basic amine type of accelerator, best results are obtained by using around 2% by weight of zinc oxide per 100 parts by weight of rubber in the carbon black stock.

The improved abrasive characteristics of the vulcanized rubber composition obtained by the present invention is believed to be due primarily to the use of a minimum amount of zinc oxide. This is believed so because carbon black flocculates around zinc oxide particles, and when a minimum amount of zinc oxide is used there would be a minimum amount of flocculation, thus giving a stock in which the carbon black is substantially non-flocculated and uniformly dispersed. Whether or not this explanation is essentially so in all respects, the fact is that if the amount of zinc oxide as used herein is only enough to facilitate vulcanization, an improved resistance to abrasion and cracking is obtained. This unusual behavior of zinc oxide is not believed dependent on the use of any particular organic accelerator but since the presence of a certain amount of zinc usually facilitates vulcanization with any given organic accelerator and since the zinc oxide itself as used in this invention actively reduces the resistance to abrasion of the carbon black stock,—the provision of organic accelerators which are responsive to activation by a minimum amount of zinc in combination correlated with the idea of using definitely limited amounts of zinc oxide for best abrasion properties serves a two-fold purpose, namely that of giving the desired optimum vulcanization and also the best abrasion-resisting values.

While the primary feature of the invention resides in using in the carbon black stock the aforesaid small amounts of zinc in combination, its utilization for the best abrasion-resisting results requires (a) that the zinc oxide be of highly subdivided form typified by the product known and sold in the trade as Kadox having an average particle size of about 0.2 microns or less, and (b) that materials of a certain definite chemical nature be used to promote its availability in the stock in a manner to make it function as described. These materials are an organic acid or a salt thereof capable of promoting dissolution in the rubber of the zinc oxide, and if desired, the additional use of an amine having a strongly basic reaction, for the same purpose. For economical reasons the choice of a strongly basic amine type of accelerator that will actively cooperate during vulcanization with the said organic acid compound and give efficient activation with the said small amounts of zinc oxide, preferably about two parts of zinc oxide, serves a dual purpose of promoting proper acceleration and also dissolution of the zinc in combination. Examples of such accelerators are polyalkylene polyamines, or a mixture of them, prepared by reacting an alkylene dihalide with ammonia, or the methylated polyalkylene polyamines both of which types are described by U. S. Patent 1,840,932 patented Jan. 12, 1932.

Another provision of the present invention, relative to tire manufacture, is the use of the proper organic acid compound to promote dissolution of the zinc oxide. The material usually and commercially employed for this purpose is stearic acid. This material, however, has the disadvantage that it produces an undesirable fatty acid surface bloom on the raw rubber, a condition undesirable during tire building operations, and also the same effect on the cured tread compound, which detracts from the good appearance of the latter. Other materials such as oleic acid do the same, but it has been found that the use of lauric acid or zinc laurate minimizes this disadvantage and at the same time satisfactorily cooperates with the other ingredients of the carbon black stock to accomplish the purposes of this invention. The zinc oxide should be as finely divided as possible so that the reaction of the chemicals on it may be facilitated.

The combination of this invention prior to vulcanization may therefore be stated to comprise using by weight rubber 100 parts, highly subdivided zinc oxide 1-3 parts, carbon black at least 25 parts, a small amount of a vulcanizing agent, e. g. sulphur 3-4 parts, preferably 3.5 parts, so as not to cause undesirable sulphur bloom after vulcanization, and an organic accelerator responsive to activation by 1-3 parts of zinc oxide, preferably a strongly basic amine accelerator. More narrowly the invention comprises the additional use of an organic acid compound capable of promoting dissolution and uniform distribution of the zinc oxide, e. g. a small amount of a higher fatty acid material such as lauric acid or its zinc salt, preferably 1.5-4 parts, and, if desired, suitable softeners, e. g. palm oil and pine tar and appropriate anti-agers or antioxidants. Any type of rubber may be used,— smoked sheet, pale crepe, spray dried rubbers, etc. Among the accelerators which have given good results are the polyalkylene polyamines such as polyethylene polyamine and methylated polyethylene polyamine, the condensation product of butyraldehyde and aniline, reaction product of butyraldehyde and formaldehyde-aniline condensation product, methylated ethylene diamine, polymerized triethyltrimethylene triamine, mercaptobenzothiazole and its derivatives. To a less pronounced degree, other accelerators that ordinarily function well with higher amounts of zinc oxide, typified by hexamethylene tetramine, diphenylguanidine, diorthotolyl guanidine, butyraldehyde butylamine, dinitrophenyl dimethyldithiocarbamate, phenyl methylene bis-(dimethyl dithiocarbamate), also give improved abrasion resisting values, when used with 1-3 parts by weight of zinc oxide per 100 parts by weight of rubber. Polyethylene polyamine is so designated because it is believed to contain a number of individual polyethylene polyamines including diethylene triamine. For this reason polyalkylene polyamine and polyethylene polyamine are to be construed as covering either a single polyalkylene polyamine or a mixture of a number of them, partcularly those polyamines which are relatively high boiling and hence substantially non-volatile at milling temperatures.

The following preferred embodiments of the invention are given to illustrate the invention and are not to be construed as limiting thereof, the parts being by weight:

*Example 1.*—100 parts of smoked sheet rubber, 50 parts of carbon black, 2 parts of zinc oxide (Kadox), 5 parts of pine tar, 1 part of palm oil, 1.25 parts of polyethylene polyamine and 3.5 parts of sulphur are compounded on the mill in the usual manner. This stock is cured in a compression mold for 75 min. at 45 lbs. per sq. in. steam pressure. The cured stock is non-blooming, and resists abrasion about 26% better than a stock of similar composition but containing 13 parts of zinc oxide. The abrasion figure in one test for the 2 parts of zinc oxide stock is 179 and for the 13 parts of zinc oxide stock 142. Equally good results are obtained by incorporating into the mix prior to vulcanization a small amount (3 parts by weight) of zinc laurate or its equivalent, reducing the accelerator to 1 part by weight, and adding a small amount (1 part by weight) of an antioxidant, e. g. a reaction product of acetone and diphenylamine.

*Example 2.*—100 parts of smoked sheet, 50 parts of carbon black, 2 parts of zinc oxide, 5 parts of pine tar, 1 part palm oil, 3.5 parts sulphur, and 2.5 parts of a mixture of equal weights of stearic acid and methylated polyethylene polyamine, are prepared. This stock was mold cured for 75 min. at 45 lbs. per sq. in. steam pressure. The resistance to abrasion after vulcanization was about 75% better than a similar stock comprising 13 parts of zinc oxide instead of 2 parts and employing 1 part of hexamethylene tetramine and .25 part diphenylguanidine as the accelerator in place of the mixture of methylated polyethylene polyamine and stearic acid. Taking the range of cures at 45, 60, 75, 90 and 150 min. the low zinc content stock gave an average improvement in abrasion over the high zinc content stock of 67%. The mixture of methylated polyethylene polyamine and stearic acid can be prepared as follows:

Equal weights of the two materials are mixed mechanically and then heated until the mix becomes liquid. After stirring to insure homogeneity the mix is allowed to cool. The resulting product is a soft solid.

*Example 3.*—Another formula giving improved resistance to abrasion after vulcanization is

| | Parts |
|---|---|
| Rubber | 100 |
| Carbon black | 50 |
| Pine tar | 2.5 |
| Zinc laurate | 4.0 |
| Zinc oxide (Kadox) | 2.0 |
| Accelerator (mercaptobenzothiazole) | 0.75 |
| Sulphur | 3.25 |

This composition when cured 75 minutes at 30 pounds per sq. inch steam pressure gave 15% better abrasion-resistance values than a similar formula containing 5 parts of zinc oxide.

Still another formula serving the same invention is

| | Parts |
|---|---|
| Rubber | 100 |
| Carbon black | 50 |
| Pine tar | 2.0 |
| Zinc laurate | 3.0 |
| Zinc oxide (Kadox) | 1.0 |
| Accelerator (reaction product of butyraldehyde and anhydroformaldehyde-aniline condensation product) | 0.75 |
| Sulphur | 3.5 |

Anhydroformaldehyde-aniline has the probable formula $(C_6H_5N:CH_2)_2$.

The chart of the drawing indicates how with ordinary tread stock accelerators such as hexamethylene tetramine plus diphenylguanidine, maximum values of abrasion resistance reside in the use of the zinc oxide content of 1 part by weight of zinc oxide per 100 parts of rubber. Relative wear, meaning relative resistance to wear or abrasion is computed against time in minutes of cure at 45 lbs. per sq. in. steam pressure. The number on the curve is the parts by weight of zinc oxide per 100 parts by weight of rubber used. The zinc oxide (ZnO) corresponds to that normally used in tread stock having an average particle size of 0.35 microns, although as stated above a zinc oxide of a higher degree of sub-division is preferred. For instance curve 1 indicates the use of 1 part by weight of zinc oxide per 100 parts by weight of rubber in a commercial tread stock which uses more than 25 parts by weight of carbon black and shows generally a higher wear resistance compared with increased amounts of zinc oxide.

The pine tar content of the examples may be varied, lower amounts also giving improved results with the low content of zinc oxide. If desired other softeners may be used. The polyethylene polyamine or methylated derivative may be used alone or it may be first mixed with a small amount of stearic or lauric acid and then incorporated in the rubber. The amount of polyamine may vary, good results being obtainable using from 1-1.5 parts by weight of the accelerator. It is obvious that the zinc oxide instead of being added as such directly to the rubber mix, may be added in the form of rubber containing zinc oxide. Where reclaimed rubber is used 100 parts by weight of the reclaim is to be construed in the claims as equivalent to 55 parts by weight of rubber.

The term "carbon black" as used in this case is to be understood as meaning a black made from incomplete combustion of gas such as natural gas, and having a very high degree of subdivision and is to be distinguished from a black such as lamp black produced from combustion of oils and having a relatively low degree of subdivision.

This case is a continuation-in-part of application Serial No. 413,403, filed Dec. 11, 1929.

With the detailed disclosure above given, it is obvious that modifications will suggest themselves, and it is not desired to limit the invention otherwise than as set forth in the appended claims.

Having thus described my invention, what I claim and desire to protect by Letters Patent is:

1. A rubber composition suitable for tire treads and having a high abrasion resistance when vulcanized and comprising by weight rubber 100 parts, carbon black at least 25 parts, between 1 and 3 parts of zinc oxide having an average particle size of not more than about 0.2 microns, an organic accelerator which is suitably responsive to activation during vulcanization by said specified amounts of zinc oxide, a small amount of a laurate capable of promoting dissolution and uniform distribution of the zinc oxide, between 3 and 4 parts of sulphur, a rubber softener, and a small amount of a rubber anti-oxidant.

2. A process of producing a rubber product suitable for tire treads and having high abrasion-resisting characteristics which comprises milling and subsequently vulcanizing a composition containing by weight rubber 100 parts, carbon black at least 25 parts, between 1 and 3 parts of zinc oxide having an average particle size of not more than about 0.2 microns, an organic accelerator which is suitably responsive to activation during vulcanization by said specified amounts of zinc oxide, a small amount of a laurate capable of promoting dissolution and uniform distribution of the zinc oxide, between 3 and 4 parts of sulphur, a rubber softener, and a small amount of a rubber antioxidant.

3. A process of producing a rubber product suitable for tire treads and having high abrasion-resisting characteristics which comprises milling and subsequently vulcanizing a composition containing by weight rubber 100 parts, carbon black at least 25 parts, between 1 and 3 parts of zinc oxide having an average particle size of not more than about 0.2 microns, an organic accelerator which is suitably responsive to activation during vulcanization by said specified amounts of zinc oxide, a small amount of a higher fatty acid material capable of promoting dissolution and uniform distribution of the zinc oxide, between 3 and 4 parts of sulphur, a rubber softener, and a small amount of a rubber antioxidant.

4. A process of increasing the abrasion resistance when vulcanized of a high carbon black-rubber stock suitable for tire treads which comprises uniformly mixing by weight rubber 100 parts, carbon black at least 25 parts, between 1 and 3 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

5. A rubber composition suitable for tire treads and having a high abrasion resistance when vulcanized and comprising by weight rubber 100 parts, carbon black at least 25 parts, between 1 and 3 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

6. A rubber composition suitable for tire treads and having a high abrasion resistance when vulcanized and comprising by weight rubber 100 parts, carbon black at least 25 parts, about 1-2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

7. A process of increasing the abrasion resistance when vulcanized of a high carbon black-rubber stock suitable for tire treads which comprises uniformly mixing by weight rubber 100 parts, carbon black about 50 parts, about 1-2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

8. A rubber composition suitable for tire treads and having a high abrasion resistance when vulcanized and comprising by weight rubber 100 parts, carbon black about 50 parts, about 1-2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and an aldehyde-amine accelerator which is suitably responsive to activation during vulcanization by said specified amounts of zinc oxide.

9. A rubber composition suitable for tire treads and having a high abrasion resistance when vulcanized and comprising by weight rubber 100 parts, carbon black at least 25 parts, between 1 and 3 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and a reaction product of butyraldehyde and formaldehyde-aniline condensation product.

10. A rubber composition suitable for tire treads and having a high abrasion resistance when vulcanized and comprising by weight rubber 100 parts, carbon black about 50 parts, about 1–2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and a reaction product of butyraldehyde and formaldehyde-aniline condensation product.

11. A process of producing a rubber product suitable for tire treads and having high abrasion resisting characteristics when vulcanized which comprises milling and subsequently vulcanizing a composition containing by weight rubber 100 parts, carbon black at least 25 parts, about 1–2 parts of zinc oxide having an average particle size of not more than about 0.2 microns, a small amount of a higher fatty acid material capable of promoting dissolution and uniform distribution of the zinc oxide, about 3–4 parts of sulphur, and an organic accelerator which is suitably responsive to activation during vulcanization by said specified amounts of zinc oxide.

12. A rubber composition suitable for tire treads and having a high abrasion resistance when vulcanized and comprising by weight rubber 100 parts, carbon black at least 25 parts, about 1 to 2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and a reaction product of butyraldehyde and formaldehyde-aniline condensation product.

13. A rubber composition suitable for tire treads and having a high abrasion resistance when vulcanized and comprising by weight rubber 100 parts, carbon black at least 25 parts, about 1 to 2 parts of zinc oxide having an average particle size of not more than about 0.2 microns, a small amount of a higher fatty acid material capable of promoting dissolution and uniform distribution of the zinc oxide, a small amount of sulphur sufficient not to cause undesirable sulphur bloom after vulcanization, and mercaptobenzothiazole.

14. A rubber composition suitable for tire treads and having a high abrasion resistance when vulcanized and comprising by weght rubber 100 parts, carbon black at least 25 parts, about 1 to about 2 parts of zinc oxide, a small amount of a higher fatty acid material capable of promoting dissolution and uniform distribution of the zinc oxide, a small amount of sulphur sufficient not to cause undesirable sulphur bloom after vulcanization, and a reaction product of butyraldehyde and formaldehyde-aniline condensation product.

15. A rubber composition suitable for tire treads and having a high abrasion resistance when vulcanized and comprising by weight rubber 100 parts, carbon black at least 25 parts, about 1 to about 2 parts of zinc oxide, a small amount of a higher fatty acid material capable of promoting dissolution and uniform distribution of the zinc oxide, a small amount of sulphur sufficient not to cause undesirable sulphur bloom after vulcanization, and an arylene thiazyl sulphide accelerator.

16. A process of increasing the abrasion resistance when vulcanized of a high carbon black rubber stock suitable for tire treads which comprises uniformly mixing by weight rubber 100 parts, carbon black at least 25 parts, between 1 and 3 parts of zinc oxide, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

17. A process of increasing the abrasion resistance when vulcanized of a high carbon black rubber stock suitable for tire treads which comprises uniformly mixing by weight rubber 100 parts, carbon black at least 25 parts, between 1 and 3 parts of zinc oxide, a small amount of a higher fatty acid material capable of promoting dissolution and uniform distribution of the zinc oxide, a small amount of sulphur sufficient not to cause undesirable sulphur bloom after vulcanization, and an arylene thiazyl sulphide accelerator which is suitably responsive to activation during vulcanization by said specified amounts of zinc oxide.

18. A rubber composition suitable for tire treads and having a high abrasion resistance when vulcanized and comprising by weight rubber 100 parts, carbon black at least 25 parts, about 1 to about 2 parts of zinc oxide, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

19. A rubber composition suitable for tire treads and having a high abrasion resistance when vulcanized and comprising by weight rubber 100 parts, carbon black at least 25 parts, between 1 and 3 parts of zinc oxide, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

20. A rubber composition suitable for tire treads and having a high abrasion resistance when vulcanized and comprising by weight rubber 100 parts, carbon black at least 25 parts, about 1–3 parts of zinc oxide, a small amount of a higher fatty acid material capable of promoting dissolution and uniform distribution of the zinc oxide, a small amount of sulphur sufficient not to cause undesirable sulphur bloom after vulcanization, and an arylene thiazyl sulphide accelerator which is suitably responsive to activation during vulcanization by said specified amounts of zinc oxide.

21. A process of increasing the abrasion resistance when vulcanized of a high carbon black-rubber stock suitable for tire treads which comprises uniformly mixing by weight rubber 100 parts, carbon black about 50 parts, about 1 to about 2 parts of zinc oxide, a small amount of a higher fatty acid material capable of promoting dissolution and uniform distribution of the zinc oxide, a small amount of sulphur sufficient not to cause undesirable sulphur bloom after vulcanization, and an organic accelerator which is suitably responsive to activation during vulcanization by said specified amounts of zinc oxide.

22. A process of producing a rubber product suitable for tire treads and having high abrasion-resisting characteristics which comprises milling and subsequently vulcanizing a composition containing by weight rubber 100 parts, carbon black at least 25 parts, between 1 and 3 parts of zinc oxide, an organic accelerator which is suitably responsive to activation during vulcanization by said specified amounts of zinc oxide, a small amount of a higher fatty acid material capable of promoting dissolution and uniform distribution of the zinc oxide, between 3 and 4 parts of sulphur, a rubber softener, and a small amount of a rubber antioxidant.

23. As a new article of manufacture, a tire having a tread portion which is the vulcanization product of the composition of claim 19 and characterized in having a high abrasion resistance.

SIDNEY M. CADWELL.